US 8,488,591 B2

(12) United States Patent
Miali et al.

(10) Patent No.: US 8,488,591 B2
(45) Date of Patent: Jul. 16, 2013

(54) METHOD AND SYSTEM FOR VIDEO TELEPHONE COMMUNICATIONS SET UP, RELATED EQUIPMENT AND COMPUTER PROGRAM PRODUCT

(75) Inventors: Margherita Miali, Martina Franca (IT); Danilo Decaroli, Taranto (IT); Alessandro De Vincentis, Turin (IT); Grazia De Nitto, Turin (IT); Maurizio Belluati, Turin (IT); Alberto Cuda, Turin (IT); Silvia Tessa, Turin (IT)

(73) Assignee: Telecom Italia S.p.A., Milan (IT)

( * ) Notice: Subject to any disclaimer, the term of this patent is extended or adjusted under 35 U.S.C. 154(b) by 1645 days.

(21) Appl. No.: 11/794,164

(22) PCT Filed: Dec. 23, 2004

(86) PCT No.: PCT/EP2004/014677
§ 371 (c)(1),
(2), (4) Date: Aug. 15, 2007

(87) PCT Pub. No.: WO2006/066610
PCT Pub. Date: Jun. 29, 2006

(65) Prior Publication Data
US 2008/0143817 A1    Jun. 19, 2008

(51) Int. Cl.
*H04L 12/66* (2006.01)

(52) U.S. Cl.
USPC ............ 370/352; 348/14.01; 348/14.11; 370/353; 370/354; 379/201.01; 379/219; 379/242; 379/350; 709/201; 709/227

(58) Field of Classification Search
USPC ............ 348/14.01–14.16; 370/259–271, 370/351–356; 709/201–207, 217–248; 455/412.1–420, 426.1, 426.2, 550.1–560, 455/575.1–575.9
See application file for complete search history.

(56) References Cited

U.S. PATENT DOCUMENTS 4,654,866 A * 3/1987 Bottle et al. .............. 348/14.11
5,371,534 A * 12/1994 Dagdeviren et al. ....... 348/14.01
(Continued)

FOREIGN PATENT DOCUMENTS

EP    0 999 712 A2    5/2000
FR    2 814 623        3/2002
(Continued)

OTHER PUBLICATIONS

Thom, G. A. et al., "H.323: The Multimedia Communications Standard for Local Area Network," IEEE Communications Magazine, pp. 52-56, (Dec. 1996).

(Continued)

*Primary Examiner* — Hemant Patel
(74) *Attorney, Agent, or Firm* — Finnegan, Henderson, Farabow, Garrett & Dunner, L.L.P.

(57) ABSTRACT

A method of setting up a video telephone call between a first video telephone terminal and a second video telephone terminal on a data network includes the steps of: establishing a telephone call over a telephone network between the first and second terminals; exchanging between the first and second terminals during the telephone call availability signals to seek availability to hold a video telephone call; if the availability is confirmed, releasing the telephone call; establishing respective telephone calls between each of the first and second terminals and a corresponding access server of the data network, for achieving connection of the first and second terminals to the data network; establishing a signalling exchange between the first and second terminals through a service center of the data network to achieve the set up of the video telephone call; and establishing a peer-to-peer video telephone call between the first and second terminals over the data network.

1 Claim, 5 Drawing Sheets

U.S. PATENT DOCUMENTS

| | | | |
|---|---|---|---|
| 5,389,965 A * | 2/1995 | Kuzma | 348/14.05 |
| 6,320,952 B1 * | 11/2001 | Bruno et al. | 379/211.02 |
| 6,545,697 B1 * | 4/2003 | Parker et al. | 348/14.01 |
| 6,750,897 B1 * | 6/2004 | Moshrefi et al. | 348/14.08 |
| 7,050,553 B2 * | 5/2006 | Chang et al. | 379/93.15 |
| 7,099,288 B1 * | 8/2006 | Parker et al. | 370/259 |
| 7,446,795 B2 * | 11/2008 | Rengaraju et al. | 348/14.01 |
| 2004/0076145 A1 * | 4/2004 | Kauhanen et al. | 370/352 |
| 2005/0053051 A1 * | 3/2005 | Beyda et al. | 370/351 |
| 2005/0073574 A1 * | 4/2005 | Krisbergh et al. | 348/14.01 |
| 2005/0113064 A1 * | 5/2005 | Halsell | 455/406 |
| 2008/0037513 A1 * | 2/2008 | Gerding et al. | 370/352 |

FOREIGN PATENT DOCUMENTS

| | | |
|---|---|---|
| FR | 2 829 893 | 3/2003 |
| WO | WO 02/37848 A1 | 5/2002 |
| WO | WO 03/005641 A1 | 1/2003 |
| WO | WO 03/034692 A2 | 4/2003 |

OTHER PUBLICATIONS

Kumar, K. A. et al., "A Multi-Signaling Protocol Architecture for Voice over IP Terminal," IEEE SM '03, pp. 1191-1199, (2004).

Reid, M., "Media Conferencing over ISDN and IP Networks Using ITU-TH-Series Recommendations: Architecture, Control and Coordination," Computer Networks, vol. 31, pp. 225-235, (1999).

International Telecommunication Union, ITU-T Telecommunication Standardization Sector of ITU; Series H: Audiovisual and Multimedia Systems Infrastructure of Audiovisual Services—Communication Procedures, ITU-T Recommendation H.242, pp. i-v and 1-83, (Mar. 2004).

International Search Report mailed Jun. 10, 2005, for International Patent Application No. PCT/EP2004/014677.

* cited by examiner

METHOD AND SYSTEM FOR VIDEO TELEPHONE COMMUNICATIONS SET UP, RELATED EQUIPMENT AND COMPUTER PROGRAM PRODUCT

CROSS REFERENCE TO RELATED APPLICATION

This application is a national phase application based on PCT/EP2004/014677, filed Dec. 23, 2004.

FIELD OF THE INVENTION

The present invention relates to video telephone communication technology.

As used herein, "video telephone" (or, briefly, "videophone") is generally intended to encompass all those technologies enabling voice/video communications to take place on standard carriers for telephone communications.

DESCRIPTION OF THE RELATED ART

Transmitting voice and video signals on standard carriers used for transmitting speech signals (namely a standard telephone line) is made possible by compression techniques that reduce the bandwidth/bit-rate associated with those signals.

These techniques take advantage of the redundancy inherent in speech and video signals to produce a combined speech/video signal adapted to be transmitted without substantial impairment over telephone lines of standard telephone networks both of the fixed and the mobile type.

Video telephone communications have been the subject matter of extensive literature, including patent literature.

Exemplary patent documents concerning video telephone technology are U.S. Pat. No. 4,654,866, WO 03/005641 A1 and U.S. Pat. No. 6,545,697 B1.

U.S. Pat. No. 4,654,866, for example, provides for an integrated communication system including a narrow-band telephone network and a superposed video-telephone network. To permit a video-telephone network structure independent of the structure of the narrow-band telephone network, each subscriber of the video-telephone network must be assigned a separate video-telephone call number for the path search in the broad band (video-telephone) network.

WO 03/005641 A1 relates to a communication system and method for establishing a broadband connection, for example a multi-media connection between two or more users, by means of exchanges in a communication network such as an ATM network. According to WO 03/005641 A, when the exchanges receive a request from a calling user to establish a broadband connection, for example a video telephone call at 2 Mbit, the exchanges first establish a minimal connection (such as a 64 kbit audio connection) between the users and once the minimal connection is in operation, the requested broadband connection is established.

U.S. Pat. No. 6,545,697 B1 discloses a user system or device which uses a called number to establish a telephone call over a public telephone network to a called party. In response to the telephone call, the user system or device transfers a video call request to a server system over a public data network. The Applicant observes that the technique described in U.S. Pat. No. 6,545,697 B1 provides for continuing the telephone call still during the video call, and the two calls are stopped together. This is made possible, according to the Applicant, only if the terminals are provided with a double interface for the telephone and data networks.

The Applicant notices that, although the solution of establishing the video call on a data network during a communication already established over a telephone network is particularly advantageous, the proposed technique for doing so has the main drawback that the terminals require a double interface towards the two different networks and that the telephone call is kept alive during the video call.

OBJECT AND SUMMARY OF THE INVENTION

The object of the present invention is thus to provide a technique for efficiently establishing a video call between two users.

The Applicant has in particular devised a technique for efficiently establishing a video call on a data network after having set up a telephone call over a telephone network between the two users equipped with the video phones.

For the purposes of the present invention, with "telephone network" it is intended a circuit-switched network and with "data network" it is intended a "packet-switched network".

Moreover, with "video call" or "video telephone call" it is intended a connection suitable for transmitting audio/video signals.

The Applicant has found that by starting the communication by a telephone call over a telephone network, releasing the telephone call if availability of the two video phone terminals to hold a video telephone call is ascertained, and then establishing, after the telephone call has been released, a video telephone call between the two terminals over a data network, it is possible to set up the video call between two users in a more efficient way with respect to the above mentioned prior art.

The object of the present invention is in particular achieved by means of a method having the features set forth in the claims that follow. The invention also relates to a corresponding system, related apparatus (e.g. a video telephone terminal) adapted for use in such a system, and a computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

In a preferred embodiment, the method of the present invention comprises establishing a telephone call over a telephone network between a first and a second video telephone terminal; exchanging between said first and second terminals, during the telephone call, availability signals to seek availability to hold a video telephone call; if said availability is confirmed, releasing the telephone call; establishing respective telephone calls between each of the first and second terminals and a corresponding access server of a data network, for achieving connection of the first and second terminals to the data network; establishing a signalling exchange between the first and second terminals through a service center of the data network to achieve the set up of the video telephone call; and establishing a peer-to-peer video telephone call between the first and second terminals over the data network.

It can be appreciated that telephone call is terminated before establishing the video call between the users. Therefore, the communication resources are efficiently exploited and, during the video call, there is no waste of resources on the telephone network.

Moreover, it can be appreciated that the above technique for video phone connection can be performed by using wired video terminals that are provided with a single network interface, in particular with an interface suitable for connection with the telephone network. Therefore, there is no need for a broadband interface, and even less of a double interface (narrowband and broadband). The technique of the present invention thus allows provisioning of video phone services to a user provided of a typical domestic narrowband connection, without requiring the subscription to a broadband video communication service and the installation of a broadband connection.

The terminals are configured to communicate alternatively over a telephone network or a data network, and local connections with both type of networks is done through the local exchanges (i.e. the local nodes allowing connection of the terminals to the network) of the telephone line. In particular, connection of the video terminals to the data network is made possible by establishing a connection between each exchanger and a corresponding access server of the data network.

In the arrangement described herein, the parties already involved in a standard telephone call may decide at any time to convert the telephone call into a video telephone call. Additionally, the parties may elect that the costs of the video telephone call (or just the video portion of a call) should be billed according to any sort of flexible plan, including e.g. the costs being borne by the parties with equal or different percentages. In particular, the parties may elect that the costs of the video telephone call (or just the video portion of a call) should be billed according to a billing scheme different from the billing scheme adopted for the initial telephone call.

The solution of the present invention also provides interoperability with different types of services offered by one or more providers, such as broadband data access or internet services, which could alternatively be provided through a gateway access from PSTN but with a substantive worsening of the signal quality.

The following detailed description of an exemplary embodiment of the invention provided in the following refers—for the sake of simplicity—to a videophone call involving two parties. However, those of skill in the art will promptly appreciate that the arrangement described herein may be applied to multi-party calls.

BRIEF DESCRIPTION OF THE ANNEXED DRAWINGS

The invention will now be described, by way of example only, by referring to the annexed figures of drawing, wherein.

DETAILED DESCRIPTION OF AN EXEMPLARY EMBODIMENT OF THE INVENTION

Figure 1:
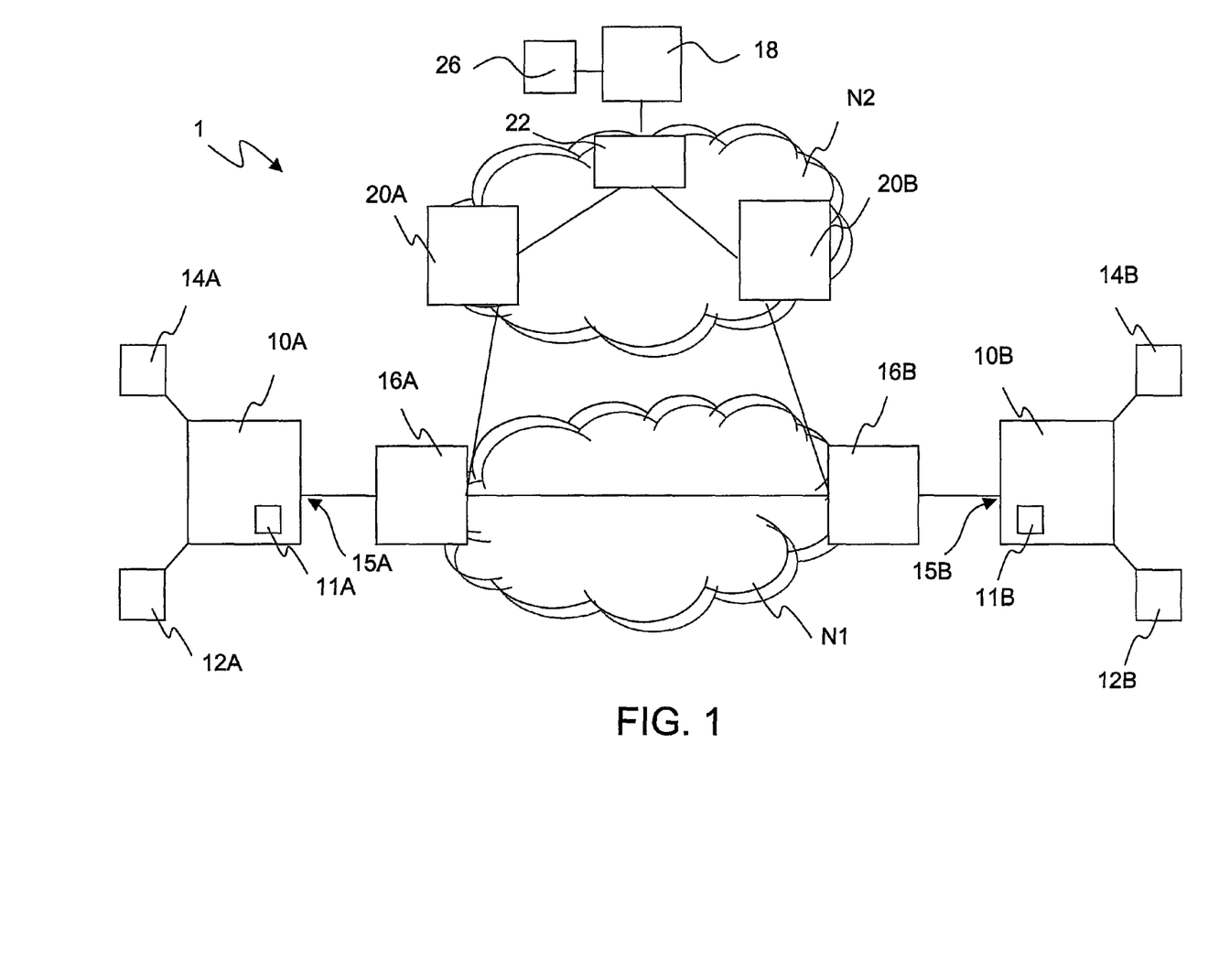
FIG. 1 is a block diagram showing a typical scenario of use of the arrangement described herein.

In the block diagram of FIG. 1, reference numeral 1 indicates a communication system including two terminals 10A and 10B suitable to be connected via a telephone network N1 or a data network N2.

Telephone network N1 is a network is a circuit-switched network, for example a PSTN (Public Switched Telephone Network) network, fixed and/or mobile, adapted to ensure speech communications between the terminals 10. Data network N2 is a packet-switched network, i.e. a network different and separate from network N1 dedicated to data transport. Preferably, network N2 is an IP network, so that reference will be made in the following to an IP network, for the sake of simplicity.

Both terminals 10A and 10B are equipped with the videophone facilities enabling them to transmit and receive both speech and video signals via corresponding user interfaces 12A, 12B and 14A, 14B.

Specifically, each interface 12A, 12B is a speech interface typically comprised of a microphone and a loudspeaker. Each interface 14A, 14B is a video interface usually comprised of a camera (such as a camera of the type currently referred to as a "webcam") and a screen (typically comprised of an LCD screen).

The terminals 10A, 10B are advantageously narrowband terminals, of a type suitable to connect to a telephone network, and are provided with a single narrowband-type interface 15A, 15B. Both terminals 10A, 10B are equipped with a modem, which is preferably of the V.92 type.

In the purely exemplary embodiment shown herein, the terminals 10A, 10B are connected to the network N1 via respective nodes (exchanges) 16A, 16B. The nodes 16A, 16B are local exchanges on the Switched Circuit Network.

Connection of the nodes 16A, 16B within the telephone network N1 can be based on SS7 signalling system.

The packet switched data network N2 comprises a first and a second Network Access Server (NAS) 20A, 20B, providing access to the data network N2 from the telephone network N1, a service center 18 and at least a Proxy server 22. Proxy server 22 may be for example a Proxy RADIUS (Remote Authentication Dial-In User Service). Reference will be made in the following to this type of server.

RADIUS is a client-server protocol for providing authorization, identification, authentication, and accounting services for distributed dial-up/remote access networking. In particular, this protocol enables remote access equipment acting as RADIUS client (typically a dial-up server used by an ISP) to submit authentication and accounting requests (by sending specific user information) to a RADIUS server. The RADIUS server can thus validate the RADIUS client request.

Accordingly, the Proxy RADIUS 22 is a server used for managing remote access service, which has access to user account information and can check remote access authentication credentials. If the user's credentials are authentic and the connection attempt is authorized, the Proxy RADIUS 22 authorizes the user's access based on specified conditions and logs the remote access connections as accounting events.

The use of RADIUS allows the remote access user authentication and authorization and accounting data to be maintained in a central location, rather than on each network access server (NAS). As will be described in greater detail in the following, users connect to the RADIUS-compliant NASs 20A, 20B by running a Routing and Remote Access service which, in turn, forward authentication requests to the centralized Internet Authentication Service (IAS) server.

Preferably, the service center 18 maintains a database adapted to collect Call Records (Call Detailed Records or, briefly, CDRs) related to video phone calls established between the two terminals 10A, 10B. Such Call Records typically include information items concerning the two (or more) parties involved in the call, the time of start of the videophone call, the duration of the call, specific criteria to be adopted for billing the videophone call to the parties involved, and so on.

The service center 18 comprises the functionalities for setting up, controlling and releasing the video communication (such as signalling processing and service logic execution) and a user Data Base (DB) 26 for storing both static and dynamic information regarding the system users registered on said service center.

Figure 2:
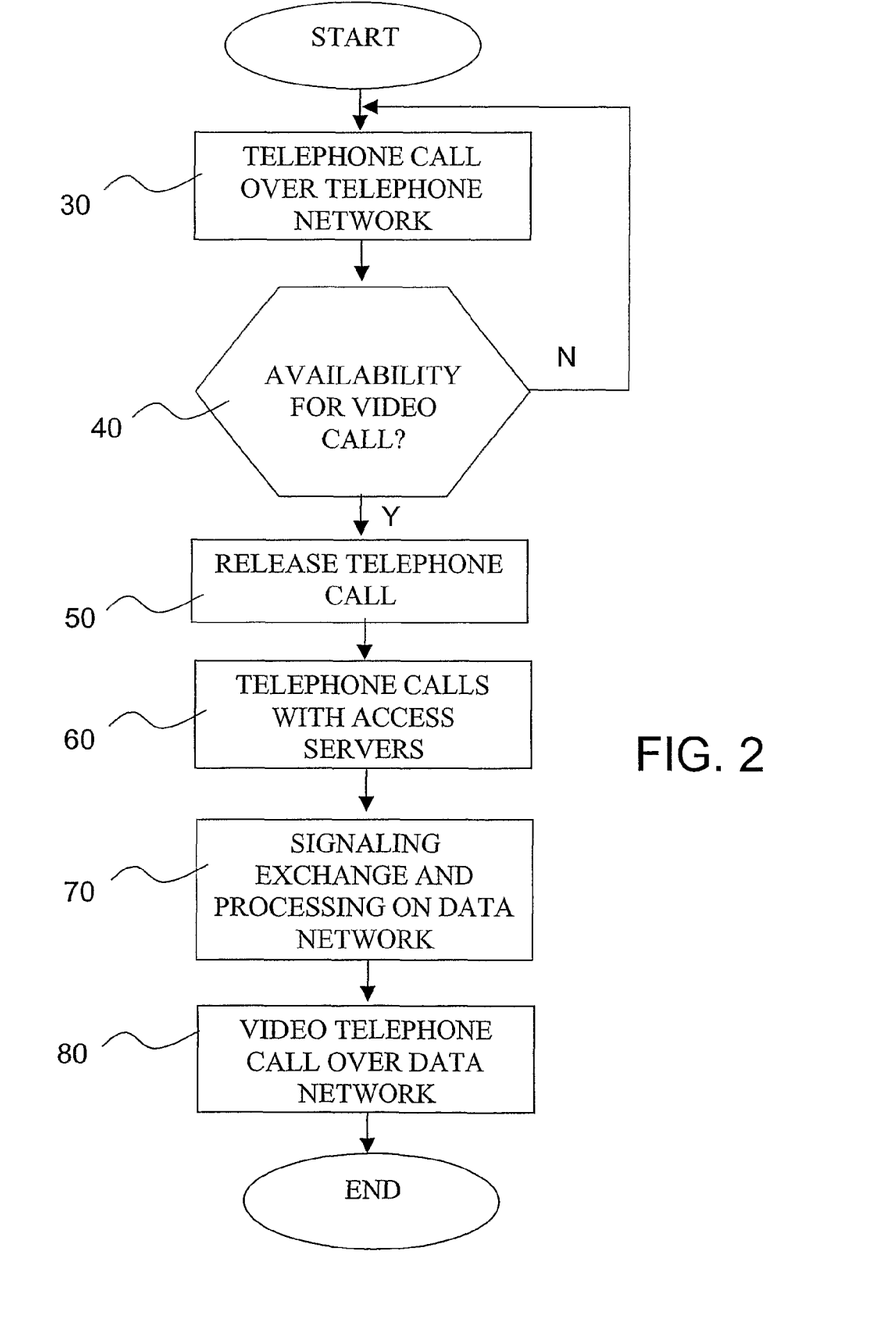
FIG. 2 is a flow chart summarizing the main steps of the method of the present invention.

FIG. 2 shows a flow chart summarizing the main steps of the method of the present invention.

The communication between terminals 10A and 10B starts with a telephone call (block 30).

During the telephone call, the two users may decide to communicate each other by video call. Availability of video call is thus verified (block 40).

In the negative (video call not available, output N from block 40), the users can continue their telephone call. In case the availability of the video call is ascertained (output Y from block 40), the telephone call is released (i.e. terminals 10A and 10B disconnect from telephone terminal N1) (block 50), and two separate telephone calls (so-called "dial-up" calls) between the terminals 10A, 10B and the access servers 20A, 20B (via the nodes 16A, 16B) are established (block 60). These telephone calls are made for achieving connection of the first and second terminals 10A and 10B to a data network N2.

During these telephone calls, it is established a signalling exchange over the data network N2 between the two terminals 10A, 10B and the service center 18 for requesting the setting up of the video call and a processing of exchanged information by the service center 18 (block 70).

Finally, a peer-to-peer video telephone call between said first and second terminals is established over said data network N2 (block 80).

The method of the present invention will be hereinbelow described in greater detail with reference to the flow charts of FIGS. 3 to 5. The various columns of are labelled with references 10A and 10B corresponding to the two terminals (and, indirectly, the two customers equipped with those terminals), while the references 16A and 16B correspond to the two nodes enabling the terminals 10A and 10B to connect to the networks N1 and N2. Finally, the reference 18 corresponds to the service center.

Once again it will be recalled that the following detailed description refers to a videophone call involving two parties. This is essentially for the sake of simplicity, and those of skill in the art will be able to derive from this description the criteria for applying the arrangement described herein to multi-party calls, i.e. calls involving three or more parties. In that case, specific technical arrangements are required in order to properly distribute the video signal generated by any party in the call to the other parties. Technical arrangements supporting this mode of operation are known in the art and do not require to be described in detail here.

Figure 3:
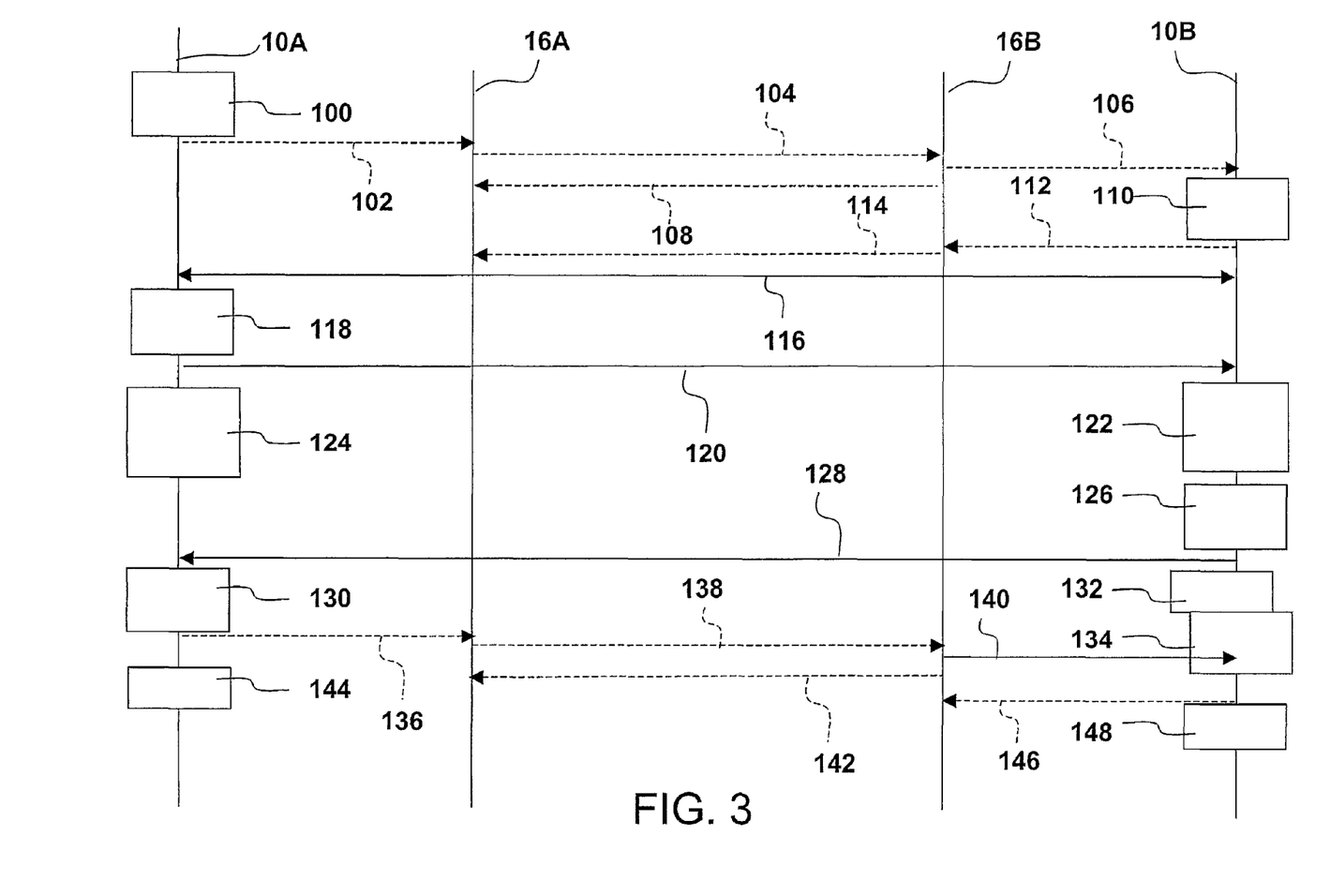
FIGS. 3 to 5 are flow-charts exemplary of a typical sequences of steps occurring in an exemplary embodiment of the arrangement described herein.

Essentially, the chart of FIG. 3 is representative of the steps taken in order to set up a standard telephone (i.e. speech) call between the terminals 10A and 10B and to negotiate a video call between them. These steps as a whole form the steps represented by blocks 30, 40 and 50 in FIG. 2.

Figure 4:
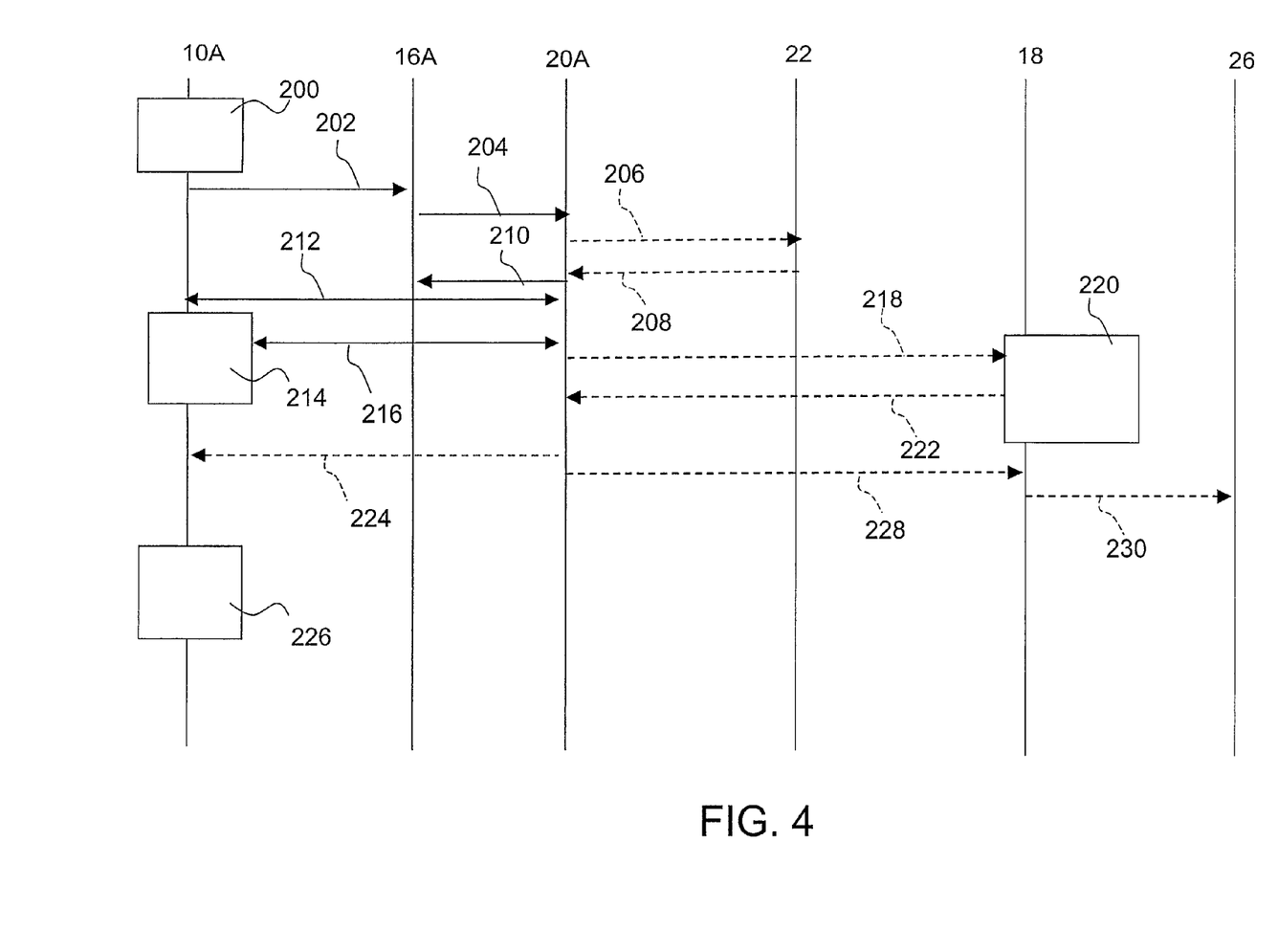

The chart of FIG. 4 is representative of the basic steps involved in establishing a dial-up call for the access to the data network N2. These steps as a whole form the steps represented by blocks 60 and 70 in FIG. 2.

Figure 5:
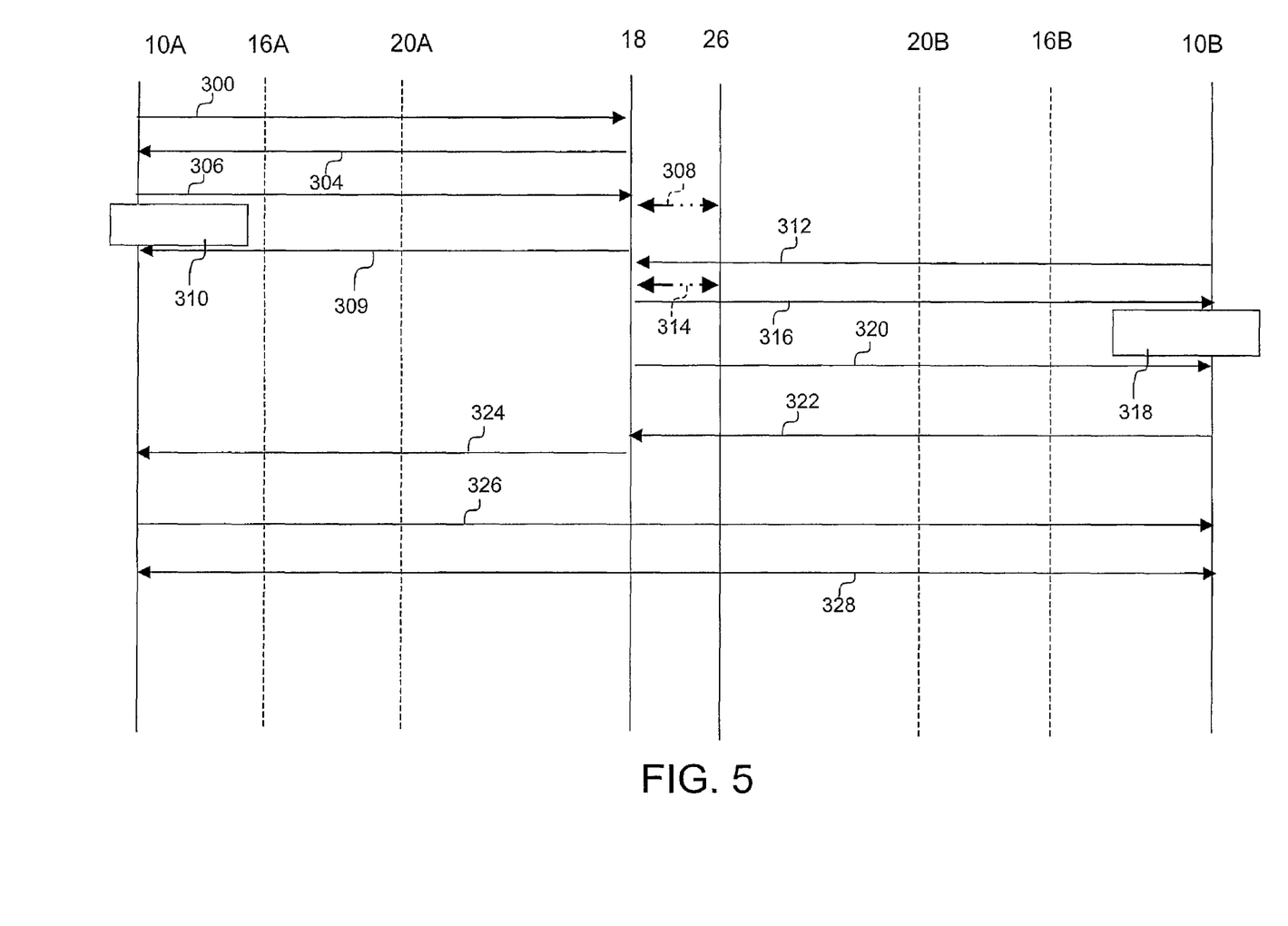

Finally, the chart of FIG. 5 is representative of the steps involved in the set up of the video call over the data network N2. These steps as a whole form the telephone call step represented by block 80 in FIG. 2.

In all of the flow charts of FIGS. 3 to 5 dashed lines indicate the signalling flow, while continuous lines indicate voice or voice/video trunk flow signals.

In the chart of FIG. 3, reference 100 designates a step by means of which the customer using the terminal 10A (hereinafter "customer 10A") dials the phone number of another customer provided with terminal 10B (hereinafter "customer 10B").

To that end, the customer 10A dials the phone number of customer 10B or chooses the 10B number from the phone book. Under these "off hook" conditions, the dialed numbers are sent in a step 102 to the node 16A. Typically, multi frequency dialing (DTMF—Dual Tone Multi Frequency) is used for that purpose.

In a step 104, through the public switched telephone network N1, the node (exchange) 16A sends a combined IAM (Initial Address Message), SAMs (Subsequent Address Messages)—if any—to the node (exchange) 16B which, in a step 106, activates ringing with the telephone terminal 10B.

In a step 108 the node 16B sends an ACM (Address Completed Message) to the node 16A.

A step 110 is representative of the customer 10B answering the call, which leads to an "off hook" condition being received by the node 16B in a step 112 while in a step 114 the node 16B sends an ANM (ANswer Message) to the node 16A.

A regular telephone call, represented by a step 116, is thus established between the customer 10A and the customer 10B over the telephone network N1.

The following steps are representative of the customer 10A and 10B negotiating over the voice trunk previously established a joint agreement to switch from a telephone call to a video telephone call. In other words, availability to connect on a video call is checked.

In the exemplary embodiment shown herein, the process will be assumed to be started by the customer 10A.

Those of skill in the art will however promptly appreciate that the process can be started in a thoroughly similar way by the customer 10B.

Additionally, it will be appreciated that the negotiation to switch from a telephone call to a video telephone call may be started at any time after the telephone call has been setup. Stated otherwise, in the arrangement described herein, no direct dependency/relationship exists between the time where the telephone call is setup and the time when the telephone call is switched into a video telephone call.

It will be further appreciated that setting up a regular telephone call between the customers 10A and 10B enables these to ascertain that both customers are equipped with video telephone terminals.

In order to establish the video telephone call, one of the customers (customer 10A, in the exemplary embodiment shown herein) takes an action such as pushing a "video" button 11A (see FIG. 1) provided in the respective video telephone apparatus.

This occurs in a step designated 118 in FIG. 3 and leads, in a step 120 to a corresponding signal (typically a DTMF tone sent over the voice trunk established between customers 10A and 10B) being sent from the terminal 10A to the terminal 10B.

The result, as represented by a step 122, is typically a message being displayed (or otherwise made available e.g. by some sort of ringing) to the customer 10B.

Simultaneously, a timer is started in a step 124 with the terminal 10A, while a corresponding message is displayed on the terminal 10A to indicate that the signal requesting possible switching to a video telephone call has been forwarded to the terminal 10B in order to give to the corresponding customer the time to express his or her desire to switch to a video telephone call.

At this point, the customer 10B may in fact refuse the proposal of switching to a video telephone call, which may simply be expressed by the customer 10B taking no action in the course of the duration of the timer started in the step 124. In that case (not positively shown in FIG. 3), the call is continued as a regular phone call.

The customer 10B typically expresses his or her consensus by pushing a corresponding "video" button 11B in his or her terminal, as represented by step 126. This leads to a corresponding signal (again typically DTMF tone) being sent in a step 128 towards the customer 10A.

It will thus be appreciated that in the preferred, exemplary embodiment shown herein switching from a telephone call to a video telephone call takes place only as a result of both customers involved (and, in general, at least two out of three or more customers possibly involved) positively expressing their desire to change the type of the call.

Those of skill in the art will further appreciate that the one shown is just an example of the many different modes that may lead the two customers 10A and 10B to reach an agreement on switching from a telephone call to a video telephone call.

Alternative embodiments may include e.g. arrangements wherein the terminal of either customer immediately issues a "proposal" signal for switching to a video call whenever a voice trunk is established with another customer, possibly after having checked that this latter is equipped with a terminal adapted to support video telephone service. Similarly, the terminal 10A, 10B of either party may be configured (e.g. programmed) in such a way to reciprocate automatically in the positive (or in the negative) any "proposal" received to establish a video telephone call.

The steps designated 130 to 148 are representative of a sequence of steps that lead to the voice trunk established between the customer 10A and 10B to be discontinued (that is the telephone call released) once the customers involved in the call have decided to switch to a video telephone call.

Specifically, after receiving the "consensus" message from the terminal customer 10B in the step 128, the terminal 10A closes in a step 130 the audio flow (so that the customers do not hear tones generated by the network) while possibly displaying a message and playing a waiting message to the effect that the video telephone call is being setup.

Simultaneously, a timer is activated in a step 132 with the terminal 10B, while in a step 134 a message is displayed to the corresponding customer indicating that the video telephone call is being setup.

The steps designated 136, 138, 140 are representative of an "on hook" condition received by the node 16A, a Release Message (REL) sent from the node 16A to the node 16B and a congestion tone sent from the node 16B to the terminal 10B. The customer using the terminal 10B will not hear this tone since, after sending the DTMF tone, the terminal 10B closes the audio flow and plays a waiting message to the customer. This message can be played until the video communication starts.

In a step 142, a RLC (Release Complete Message) is sent back from the node 16B to the node 16A while a timer is set in a step 144 with the terminal of the customer 10A.

In a step 146 an "on hook" condition (generated automatically) is received from the node 16B and in a step 148 the telephone call between the terminal/customer 10A and the terminal/customer 10B is released.

This occurs while both terminals 10A and 10B are in fact with their handsets in the "off-hook" condition.

After terminating the telephone call, the terminals make a dial-up call for accessing the data network N2 in order to request the video call. The chart of FIG. 4 is representative of the basic steps involved in establishing the dial-up call.

In this stage, the two terminals 10A and 10B make a new call by using respective Service Access Codes (SACs) to route the dial-up connection. In particular, a first code SAC1 is used for the calling party and a second code SAC2 is used for the called party.

This part of the procedure is identical for terminals 10A and 10B, therefore only the steps related to terminals 10A are represented in FIG. 4.

Specifically, in a step 200 the customer 10A (it is again recalled that the process may be alternatively started, in a thoroughly symmetrical way, by the customer 10B) starts a sequence of steps aiming at establishing a connection on the packet switched network N2 between the terminal 10A and the service center 18.

These steps include the issue of an "off hook" multi-frequency (DTMF) dialling signal (step 202) from the terminal 10A towards the node (SGU) 16A. Again it will be appreciated that such signal is generated automatically since the terminal 10A (and the terminal 10B as well) is kept with the handset in the "off-hook" condition.

Subsequently, in a step 204, the node 16A sends to the NAS 20A a SETUP message. In addition to the Service Access Code SAC1 required for the terminal 10A to reach the service center 18, the SETUP messages in question also include other information, such as the phone numbers of the customers 10A and 10B and the type of connection desired (video call).

Then, the NAS 20A sends, in a step 206, an Access Request (or Preauthentication Request) to the Proxy RADIUS 22. In a step 208, the Proxy RADIUS 22 locates the appropriate service-level agreement (SLA) that limits calls per service, and makes sure that the current call is within the limits. If the call is outside the limits, the call is rejected and an error code is returned (not shown) to the NAS 20A. If adequate resources exist for the call and the call falls within SLA limits, the call is accepted and the Proxy RADIUS 22 sends an Access Accept message to the NAS 20A.

In a step 210, the NAS 20A sends an Answer to the node 16A to inform him that the call has been accepted.

A direct telephone communication, indicated with 212, is thus established between the first terminal 10A and the first NAS 20A by using a predetermined bearer channel. The first terminal 10A thus starts using its modem (which, as previously stated, is preferably a V.92 modem), as represented by step 214. In the same time local camera can be activated, so as to allow the user to properly arrange the terminal and position himself in front of the camera.

The following steps are then performed to establish a dial-up session. In a step 216, a PPP (Point-to-Point Protocol) connection is performed between the first terminal 10A and the first NAS 20A, by which the TCP/IP communication parameters are exchanged and the network interfaces are activated.

There are a number of PPP authentication protocols that are supported by the RADIUS protocol. Each protocol has advantages and disadvantages in terms of security, usability, and breadth of support. The protocol to be used is typically determined by the configuration of the NAS device.

A user authentication process is then performed. In a step 218, the first NAS 20A sends authentication information (received through the PPP handshaking) to the Service Center 18 by means of an Access Request packet. This packet contains attributes such as the user's name, the user's password, the ID of the client and the Port ID the user is accessing.

If no response is returned within a predetermined time, the request can possibly be re-sent a number of times.

After receiving the request, the Service Center 18 validates the sending client. Validation occurs by verifying that the RADIUS Access-Request packet is sent from a configured RADIUS client. If the RADIUS client is valid, the Service center 18 consults a database of users to find the user whose name matches the request. The user account contains a list of requirements that must be met to allow access for the user. This can include verification of the password, but can also specify whether the user is allowed to access.

If any condition where the authentication or authorization is not met, the Service Center 18 sends a RADIUS Access-Reject packet in response (not shown), indicating that this user request is invalid.

If all conditions are met, the Service Center 18 sets, in a step 220, a list of configuration values for the user and places these parameters into a RADIUS Access-Accept packet that is sent back, in a step 222, to the RADIUS client, i.e. to the NAS 20A. These values include a list of RADIUS attributes and all necessary values to deliver the desired service. For PPP service type, this can include values such as: address of the terminal on the data network (e.g. IP address), address of the service center (e.g. IP address), CLI, key for user authentication on Service Center, subnet mask, MTU, desired compression, and desired packet filter identifiers.

In a step 224, the configuration values are then communicated to the first terminal 10A by the NAS 20A by using the PPP protocol. These parameters, which will be used for setting up the video communication, are stored in the first terminal 10A, as represented by step 226.

Then, the NAS 20A sends to the Service Center 18, in a step 228, an Accounting Start packet containing information related to the type of service being delivered and the user it is being delivered to. The Service Center 18 finally sends, in a step 230, a message to the Data Base 26 containing the parameters assigned to the considered dial-up session, together with other parameters such as NAS IP address, Accounting Session ID, Framed IP Address and Username required for the Session Manager.

Once the dial-up session has been completed, the two terminals 10A and 10B are able to register themselves to the Service Center 18 and then to start the video call. In the step of video call service set-up, the Service Center 18 is involved, to perform the terminals registration, service logic execution, routing, call control, billing and video call recording functionalities. Moreover, the Service Center 18 is preferably configured to perform gateway functionalities towards other networks (e.g., mobile network), using the required protocols and safety policies.

The video call session is established according to the flow chart of FIG. 5. Again, only for the sake of simplicity, it will be supposed that first terminal 10A is the calling party and second terminal 10B is the called party.

In a step 300, the first terminal 10A is registered by sending a message from the terminal 10A to the Service Center 18. The message is sent by using the parameters previously received by means of the PPP protocol during the dial-up access stage.

For example, in a SIP-session, the message may be a SIP REGISTER message and the parameters may be used the following:
Request-URI: sip:Domain
From: sip:CLI@Domain
To: sip:CLI@Domain
Contact: <sip:IPA>

The REGISTER message may contain an "Authorization" header, to allow performing an authentication procedure such as the DIGEST authentication scheme.

If the registration is validly performed, the Service Center 18 responds to the terminal 10A with a 200 OK message, as represented by step 304.

In a step 306, the first terminal 10A sends a message to the Service Center 18. For example, in a SIP-session the message may be an INVITE message containing the following main fields:
Request-URI: sip:CLIB@Domain
From: sip:anonymous@unavailable
To: sip:CLIB@Domain (CLIB is the telephone number of the called party, stored by the terminal in the telephone call stage)
Authentication Header for the application of the DIGEST method.

In a step 308, a query is performed with the Data Base 26, to check if the called party is registered on the service center 18 too.

As the INVITE message is sent, the first terminal 10A activates a timer, represented by step 310. If the first terminal 10A receives a 200 OK message from the Service Center 18 within the established time limit, as represented by step 309, the first terminal 10A is ready to start the video call. Differently, if after said time limit the first terminal 10A has not received the 200 OK message, the call is aborted.

By steps 312, 314, 316, analogous to steps 300, 302, 304, the second terminal 10B performs its registration.

In a step 318, if a 200 OK message is received from the Service Center 18, the second terminal 10B activates a timer, to check if the INVITE message is routed by the Service Center 18 towards the second terminal 10B within a due time, as represented by step 320. If, after said due time, the second terminal 10B has not received the INVITE message from the Service Centre 18, it aborts the call.

If the INVITE message has been correctly received, the second terminal 10B immediately accepts, in a step 322, the coming call by a 200 OK message directed to the Service Center 18, and the service centre 18 in turn forwards, in a step 324, a 200 OK message to the first terminal 10A. As soon as it receives the 200 OK message, in a step 326 the first terminal 10A sends an ACK message to second terminal 10B via the Service Center 18 and, in step 328, the two terminals 10A and 10B start the video call.

The video call can go on until the users decide to release the call. The process by which the video telephone call is being released is not part of the present invention and will not be described. It is however pointed out that any technique known in the art for releasing a video call established on an IP network can be used.

Typically, the video call is released by an action taken by the one of the two users or both of them. This may typically be the result of the user of terminal 10A or 10B placing his or her handset back on the telephone apparatus, which leads to an "on hook" condition being sensed by the node 16A or 16B.

It can be appreciated that the service center 18, which detains the information concerning the two terminals 10A and 10B, enables the terminals to run the billing process for the video telephone call in a completely flexible way.

Specifically, the cost of the video telephone call can be charged to either or both parties in equal or different percentages.

These percentages can be fixed beforehand, e.g. by establishing that the cost of the video telephone call will be charged to the customer who made the "proposal" to start the video telephone call (this being possibly different from the party who placed the original telephone call). Alternatively, the percentages in question may be established (in a sequence of steps not shown in FIG. 2) during either of the "initial" telephone call or the video telephone call.

It can further be appreciated that these billing arrangements may be different from those applied during the initial telephone call and may include the possibility of running a "Free phone number" service, thus causing the cost of the video telephone call to be charged—at least at certain times of day—to the party running the service.

Of course, without prejudice to the underlying principles of the invention, the details and the embodiments may vary, also significantly, with respect to what has been described and shown merely by way of example, without departing from the scope of the invention as defined by the annexed claims.

The invention claimed is:

1. A method of setting up a video telephone call between a first video telephone terminal and a second video telephone terminal, comprising the steps of:

establishing a telephone call over a circuit-switched network between said first terminal and said second terminal;

seeking, during said telephone call, availability of said first and second terminals to hold a video telephone call therebetween;

if said availability is confirmed, releasing said telephone call between said first and second terminals; and establishing, upon release of said telephone call, a video telephone call between said first and second terminals over a packet-switched network, wherein at least one of said first and second terminals alternatively connects to the circuit-switched network or to the packet-switched network, such that the terminal may not be concurrently connected with both the circuit-switched network and the packet-switched network, wherein, after releasing said telephone call and before establishing a video telephone call, the method further comprising the step of establishing respective telephone calls between said first and second terminals and corresponding access servers of said packet-switched network, for achieving connection of said first and second terminals to said packet-switched network, wherein, after establishing respective telephone calls between said first and second terminals and corresponding access servers and before establishing a video telephone call, the method further comprising establishing a signalling exchange between said first and second terminals through a service center of said packet-switched network to achieve the video telephone call.

* * * * *